Patented Dec. 8, 1931

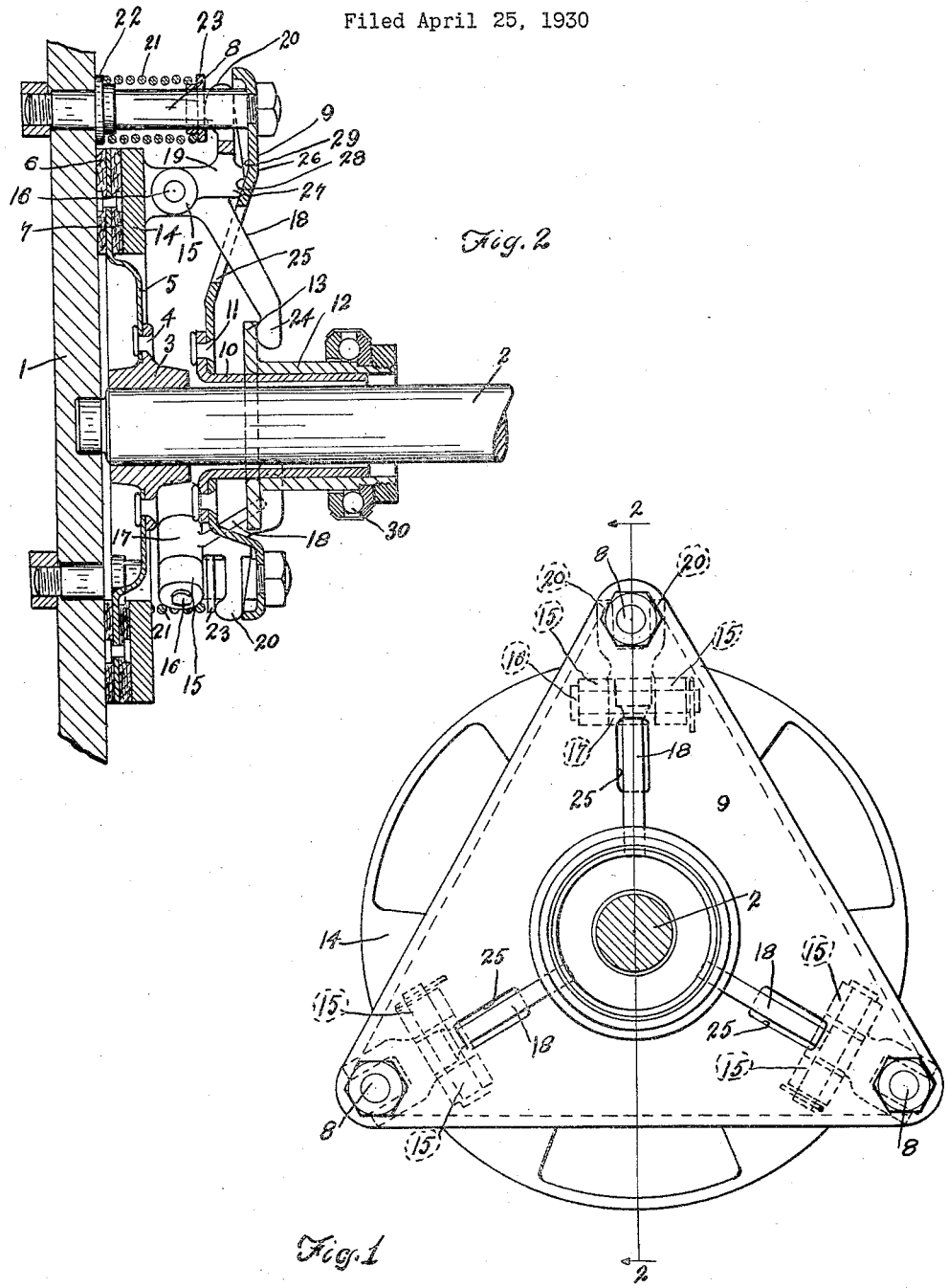

1,835,107

UNITED STATES PATENT OFFICE

CLARENCE G. WOOD, OF CLEVELAND, OHIO

CLUTCH ACTUATING MECHANISM

Application filed April 25, 1930. Serial No. 447,196.

The present invention relates, as indicated, to a clutch actuating mechanism, and more particularly to such a mechanism of the "pullout" type, and the primary object of the invention is to provide such mechanism which will be relatively simple in its construction, efficient in its operation, and relatively inexpensive to manufacture. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is an end elevation of the mechanism constructed in accordance with the present invention; and Fig. 2 is a transverse section taken substantially along the line 2—2 of Fig. 1.

Referring more particularly to the drawings, the reference numeral 1 indicates more or less diagrammatically a fly wheel having journalled therein one end of a driven shaft 2. Said shaft has keyed thereto adjacent said end, a hub or collar 3 to which is secured by means of rivets 4, or the like, an annular spring-plate 5 carrying adjacent its periphery and on its opposite faces, friction rings 6 and 7.

Bolts 8 are secured at spaced points to said fly wheel 1 and have attached thereto an annular cam plate or bracket 9, the inner periphery of which is secured to a bushing 10 by means of rivets 11, or the like. Said bushing 10 has a sliding fit upon the shaft 2, it being noted that the clearance between said bushing and said shaft is exaggerated in the drawings for clarity of illustration. A sleeve 12 is slidably and non-rotatably mounted upon said bushing 10 and is formed with an annular flange 13 adjacent its inner end.

An annular clutch ring 14 is mounted between said spring plate 5 and said bracket 9, and is provided at three spaced points upon its outer surface, with pairs of lugs 15 bored to provide bearings for pivot pins 16. A lug 17 upon each of three levers indicated generally at 18 is adapted to be received between each pair of lugs 15 and each of said lugs 17 is similarly bored for the passage of one of the pins 16. Said three levers 18 are identical, and consequently only one will be described. The lever 18 comprises one arm 19 bifurcated at its outer end to provide branches 20 adapted to straddle the bolt 8. As is clearly shown in Fig. 2, a coiled spring 21 is sleeved upon each of said bolts 8, and has its one end in abutment with the collar 22 slidable on said bolt and backed up by the fly wheel 1, and its opposite end in abutment with the collar 23 slidable on said bolt and engaging the bifurcations 20 on the arm 19 of the lever 18. The other arm 24 of said lever 18 extends through a suitably formed aperture 25 in the bracket 9 and has its end in cooperative engagement with the flange 13 of the sleeve 12.

As is clearly shown in Fig. 2, the bracket 9 is bent at 26 to provide a cam with which cooperates a projection 27 upon the arm 19 of the lever 18. It will be seen that said bend 26 provides adjacent surfaces 28 and 29 upon the bracket 9 meeting each other at an obtuse angle.

The operation of the above described mechanism is as follows. Presuming the fly wheel 1 to be rotating, the bolts 8 cause corresponding rotation of the bracket 9, levers 18, clutch ring 14, bushing 10, and sleeve 12. The force of the springs 21 will normally hold the clutch ring 14 in engagement with the friction ring 7 on the spring plate 5, and will force said spring plate 5 toward the fly wheel 1 to cause engagement of the friction ring 6 with said fly wheel.

With the parts in this condition, it will be quite apparent that the spring plate 5 and consequently the hub or collar 3 and the driven shaft 2 will be rotated in unison with the fly wheel 1. It is to be understood that a forked member is connected with the clutch operating pedal and straddles the sleeve 12, having a bearing upon the inner race member of a ball bearing union 30, and that this member may be actuated to move the sleeve 12 toward the right as viewed in Fig. 2. When the forked member is so actuated, the arm 24 of the lever 18 is moved toward the right in Fig. 2 by engagement of the flange 13 therewith, and the projection 27 on the arm 19 of said lever is caused to slide upwardly as viewed in Fig. 2, on the angular face 28 of the bracket 9. Such movement compresses the spring 21 and, by reason of the angularity of the face 28 and bracket 9, moves the clutch ring 14 slightly toward the right as viewed in Fig. 2 to permit release of the engagement of said ring 14 with the friction ring 7 and of the friction ring 6 with the fly wheel 1. With the parts in this position, it will, of course, be seen that the fly wheel 1, bracket 9, ring 14, and sleeve 12 will rotate independently of the shaft 2 and spring plate 5. As soon as the clutch actuating pedal is released, the springs 21 acting upon the bifurcations 20 of the arm 19 of the lever 18 move said lever back into the position illustrated in Fig. 2 to effect engagement of the clutch ring 14 with the friction ring 7 and of the friction ring 6 with the fly wheel 1.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a clutch actuating mechanism, a driven shaft, a sleeve slidably mounted on said shaft and provided with an annular flange, a bracket journalled on said shaft adjacent said sleeve, a clutch plate secured to said shaft, and a clutch ring mounted between said bracket and said plate, means on said ring cooperable with said sleeve, other means carried by said ring, and spring means acting on said last-named means to force the latter into contact with said bracket and the clutch ring into contact with said clutch plate.

2. Clutch actuating mechanism comprising, in combination with a rotating member and a driven shaft, a bushing sleeved on said shaft, a bracket secured to said bushing, means securing the outer portion of said bracket to said rotating member, a sleeve slidably mounted on said bushing, an annular flange on said sleeve at the end thereof adjacent said bracket, a clutch plate secured to said shaft, a clutch ring mountned between said bracket and said plate, a lever pivoted to said ring, one end of said lever extending through a suitable slot in said bracket and engaging said flange, and the other end of said lever being bifurcated and embracing said securing means, means for moving said sleeve axially, and spring means for moving said sleeve axially in one direction.

3. Clutch actuating mechanism comprising, in combination with a rotating member and a driven shaft, a bushing sleeved on said shaft, a bracket secured to said bushing, means securing the outer portion of said bracket to said rotating member, a sleeve slidably mounted on said bushing, an annular flange on said sleeve at the end thereof adjacent said bracket, a clutch plate secured to said shaft, a clutch ring mounted between said bracket and said plate, a lever pivoted to said ring, one end of said lever extending through a suitable slot in said bracket and engaging said flange, and the other end of said lever being bifurcated and embracing said securing means, means for moving said sleeve axially, and spring means cooperating with said bifurcated end of said lever for moving said sleeve axially in one direction.

4. Clutch actuating mechanism comprising, in combination with a rotating member and a driven shaft, a bushing sleeved on said shaft, a bracket secured to said bushing, means securing the outer portion of said bracket to said rotating member, a sleeve slidably mounted on said bushing, an annular flange on said sleeve at the end thereof adjacent said bracket, a clutch plate secured to said shaft, a clutch ring mounted between said bracket and said plate, a lever pivoted to said ring, one end of said lever extending through a suitable slot in said bracket and engaging said flange, and the other end of said lever being bifurcated and embracing said securing means, means for moving said sleeve axially, and a coiled spring sleeved on said securing means and cooperating with said bifurcated end of said lever for moving said sleeve axially in one direction.

5. Clutch actuating mechanism comprising, in combination with a rotating member and a driven shaft, a bushing sleeved on said shaft, a bracket secured to said bushing, means securing a portion of said bracket remote from said shaft to said rotating member, a sleeve slidably mounted on said bushing, an annular flange on said sleeve at the end thereof adjacent said bracket, a clutch plate secured to said shaft, a clutch ring mounted between said bracket and said plate, a lever pivoted to said ring, one end of said lever extending through a suitable slot in said bracket and engaging said flange, and the other end of said lever being bifurcated and embracing said securing means, projecting means on said lever, resilient means tending to move said projecting means into contact with said bracket, and means to reciprocate said sleeve.

6. Clutch actuating mechanism comprising, in combination with a rotating member and a driven shaft, a bushing sleeved on said shaft, a bracket secured to said bushing, means securing a portion of said bracket remote from said shaft to said rotating member, a sleeve slidably mounted on said bushing, an annular flange on said sleeve at the end thereof adjacent said bracket, a clutch plate secured to said shaft, a clutch ring mounted between said bracket and said plate, a lever pivoted to said ring, one end of said lever extending through a suitable slot in said bracket and engaging said flange, and the other end of said lever being bifurcated and embarcing said securing means, projecting means on said lever, resilient means acting upon the bifurcated end of said lever and tending to move said projecting means into contact with said bracket, and means to reciprocate said sleeve.

7. Clutch actuating mechanism comprising, in combination with a rotating member and a driven shaft, a bushing sleeved on said shaft, a cam-shaped bracket secured to said bushing, means securing a portion of said bracket remote from said shaft to said rotating member, a sleeve slidably mounted on said bushing, an annular flange on said sleeve at the end thereof adjacent said bracket, a clutch plate secured to said shaft, a clutch ring mounted between said bracket and said plate, a lever pivoted to said ring, one end of said lever extending through a suitable slot in said bracket and engaging said flange, and the other end of said lever being bifurcated and embracing said securing means, a projection on said lever, resilient means bearing on said bifurcated end of said lever and tending to force said projection against said cam-shaped bracket to move said ring against said plate, and means including said sleeve acting upon the opposite end of said lever to move said projection in the opposite direction along said cam surface to release the engagement between said ring and said plate.

Signed by me this 18 day of April, 1930.

CLARENCE G. WOOD.